Sept. 10, 1946.     B. E. DEL MAR     2,407,540

CABIN PRESSURE CONTROL VALVE

Filed April 30, 1943     2 Sheets-Sheet 1

Bruce E. Del Mar
INVENTOR.

BY *J. Edwin Coates*

ATTORNEY

Bruce E. Del Mar
INVENTOR.

Patented Sept. 10, 1946

2,407,540

UNITED STATES PATENT OFFICE 2,407,540

CABIN PRESSURE CONTROL VALVE

Bruce E. Del Mar, West Los Angeles, Calif., assignor to Douglas Aircraft Company, Inc., Santa Monica, Calif.

Application April 30, 1943, Serial No. 485,247

22 Claims. (Cl. 98—1.5)

This invention relates to an outlet valve device for a superchargeable aircraft cabin or other compartment.

Aircraft designed for flight at great altitudes are made with airsealed cabins and provided with air compressors for pumping air into the cabin to furnish ventilation and to mantan the pressure therein at a livable value for flight personnel when the aircraft is at altitudes at which the atmospheric pressure is below that value. It is practical to drive the compressor or compressors with an aircraft propeller engine, the compressor being provided either with a throttle or with a variable speed drive means controlled by compressor air flow in such a manner that a substantially constant rate of ventilation is provided even under the most extreme pressure conditions expected. Regulation of the pressure in the cabin or compartment is then most conveniently accomplished by adjusting a valved outlet device for the cabin, which is automatically controlled by a pressure responsive instrument.

It is an object of this invention to provide a valved outlet device of simple construction and operation for variably throttling the air discharge from a superchargeable aircraft cabin.

Difficulty may be experienced with outlets for supercharged cabins in the formation of ice at the discharge end of the outlet duct due to the cooling which accompanies rapid expansion of the airstream downstream from a restricted station along the duct. It is another object of the invention to provide a valved outlet structure of the character described in which icing of surfaces of the discharge passages is practically eliminated for all positions of adjustment of the valve.

When the pressure ratio of the cabin pressure to ambient pressure expressed in absolute values respectively is approximately two or greater, the velocity of air discharge at the outlet is equal to the velocity of sound. Under such conditions or even under conditions approaching thereto, the discharge air jet may generate sound waves which create unpleasant noise in the cabin. This noise may be louder and more disturbing by reason of resonant response of elements of the valve and aircraft structure. It is another object of this invention to provide a valved outlet structure which will discharge the air in relatively noiseless fashion at all positions of the valve, and particularly at those positions of the valve and at those air pressures in which the velocity of discharge of the air-stream approaches sonic velocity.

Air flow discharging from the cabin of the aircraft into the exterior air stream can cause a drag disturbance on the airplane if the discharge angles and velocities are poorly chosen. Conversely, however, the pressure energy dissipated during release of air from a pressure cabin often constitutes a substantial power source which, if applied directly to propulsion of the aircraft, can increase the speed of aircraft travel in the same manner that each added increment of power applied to the engine-driven propellers increases that speed. It is another object of the invention to provide a valved air outlet which will discharge the airstream in a manner which will augment and not decrease the propulsive force acting on the aircraft, and will not increase the drag of the aircraft.

It is another object of the invention to provide a valved air outlet which is capable of a full shutoff of the discharge airstream to delay and inhibit a drop in the cabin air pressure in case of failure of the compressor or of other emergency.

At low altitudes at which the cabin is not supercharged, and especially in hot weather, it is desirable from a ventilating standpoint to pass air in a large volumetric flow through the cabin from and to the outside air. It is therefore another object of the invention to provide a valved outlet device which will properly throttle the discharge airstream under supercharging conditions and which will allow free flow of air at a high volumetric rate for ventilating the cabin when the aircraft is at low altitudes and is supplied with air primarily from a ram duct open to the exterior airstream.

To attain greater sensitivity of response of the valve in the air outlet of a supercharging system of the character with which a valved outlet of this invention is to be used, the pressure responsive elements of the instrument which controls the valve position may be located in a small airtight enclosure which is in teed-in communication with the air duct leading from the compressor and similarly in communication with the valved outlet duct. Such an air circuit for the pressure responsive instrument is called an anticipator circuit. One such anticipator circuit is described in my application Serial No. 446,039 for a Control for pressure cabin, filed June 6, 1942. While it is not essential to the successful practice of the present invention that the pressure responsive instrument be located in an anticipator chamber or associated in an anticipator circuit with the outlet valve, yet when these instrumentalities are employed with the present novel valve, it is an object of my invention to furnish a flow sensitive Venturi arrangement in the discharge air stream in combination with the valve herein described to furnish the anticipator response required in the control system described in the above entitled application.

It is another object of the invention to provide a combination power and manual control for the valved outlet, the power control being responsive to cabin pressure and automatically operating at high altitudes only, and the manual control being operative at low altitudes without overriding automatic pressure control and at high altitudes only when the power control is out of action.

Other objects and advantages will be apparent as the invention is disclosed in the following description and claims read in connection with the accompanying drawings.

In the drawings, which are for illustrative purposes only:

Figure 1:
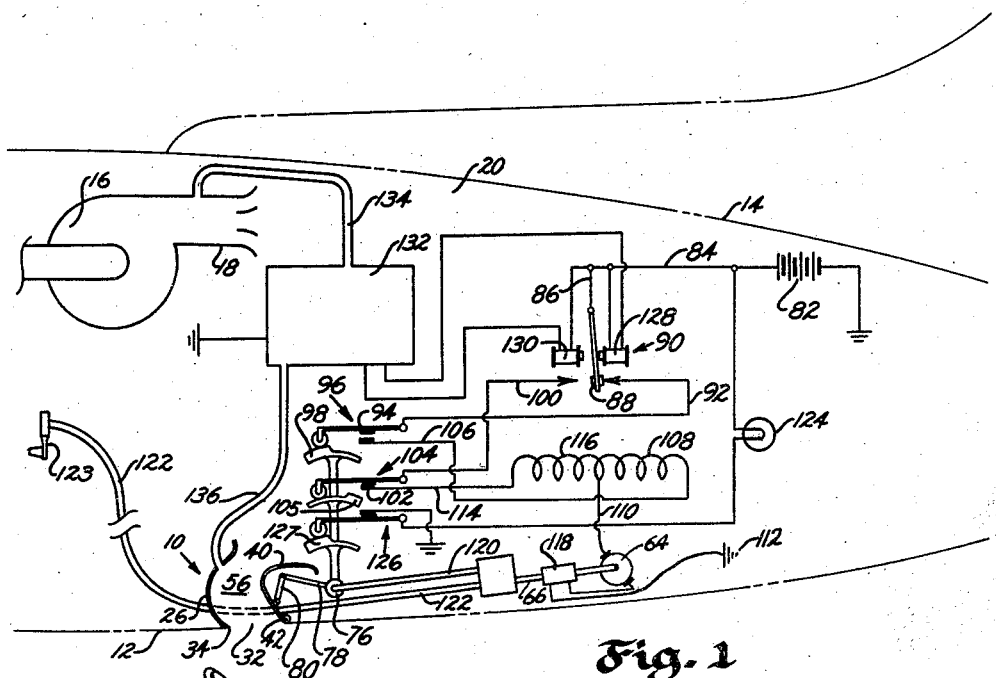
Figure 1 is a schematic view and wiring diagram of a cabin supercharging and ventilating system utilizing a valved outlet device of this invention.

In Figure 1, schematically representing a supercharging system which incorporates a valved cabin outlet of this invention, an outlet device 10 is shown installed in the bottom wall 12 of an aircraft fuselage 14, which wall, of course, has an exterior surface exposed to the air stream or relative wind. An air compressor 16, which is usually located in one of the aircraft engine nacelles and driven by the engine therein, blows air through a duct 18 leading to the air sealed or pressurized cabin compartment 20, building up a pressure therein, the degree of pressure depending principally on the discharge opening of the outlet device 10, the capacity and speed of the compressor and the ambient atmospheric pressure. The discharge opening of the outlet device 10 is automatically regulated in accordance with the cabin pressure in a manner later described.

Figure 2:
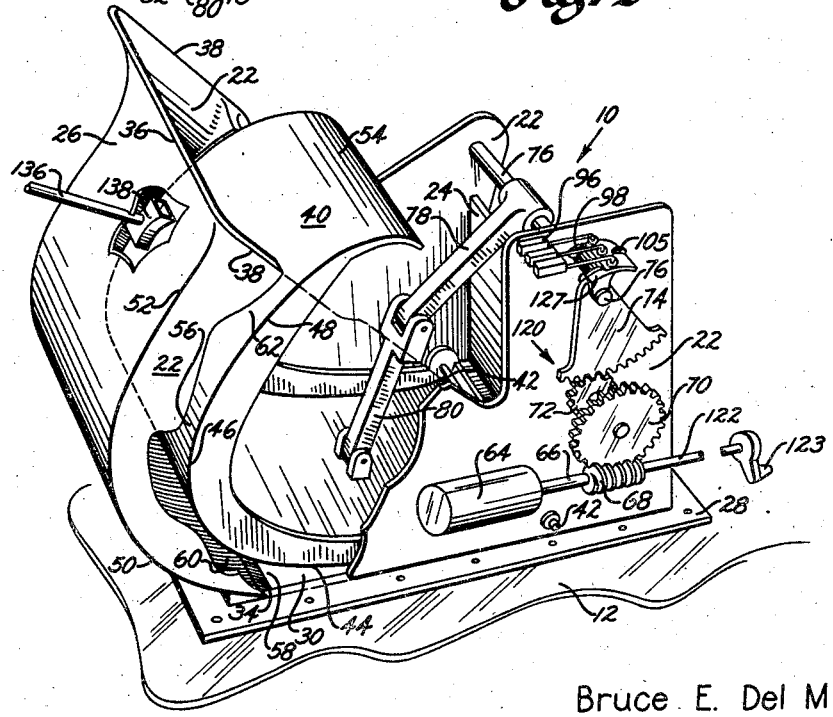
Figure 2 is a perspective view of the valved outlet structure showing a portion of the fuselage wall to which it is attached.

Referring now to Figure 2, which is a perspective view of the outlet device 10 shown secured to the fuselage skin 12, side walls 22 are spaced apart by a rear upright wall 24 and a front wall 26 and are secured to a bottom plate 28 which is in turn secured to the fuselage skin 12. The bottom plate 28 is formed with a rectangular aperture 30 occupying virtually the entire space between the lower edges of the side walls 22 and front and rear walls 24 and 26. The aperture 30 registers with a similarly shaped and sized opening 32 in the fuselage skin, shown diagrammatically in Figures 1 and 4 but with its edges hidden from view in Figure 2.

Figure 4:
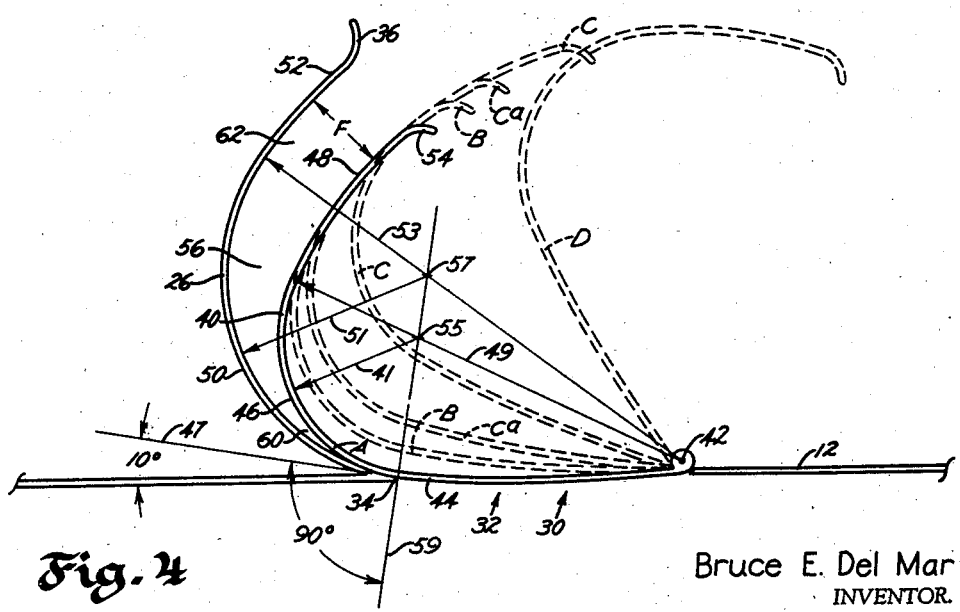
Figure 4 is a diagrammatic view of the form of the invention shown in Figure 2.

The front wall 26 is curvate in side elevation as shown in Figures 2 and 4, presenting an externally convex surface extending from a lower edge or lip 34 upwardly and forwardly and then rearwardly, terminating in an externally concave upper lip 36. A tangent to the lip 34 makes a sharp acute angle with the plane of the bottom plate 28 and fuselage skin 12, preferably of a value of about 10°. The elevational contour of the front wall 26 extends from the lip 34 in a smooth streamlined curve to the reversely curved upper lip 36, which is in the particular form of the invention described herein, somewhat in front of, but substantially vertically above the lower lip 34.

The forward edges of the side walls 22 are flush with the forward wall 26, presenting in side elevation the same contour as the forward wall. Their upper forward corners 38 are curved outwardly in the manner of the front wall lip 36.

A movable valvar wall or tongue 40 of a very similar elevational contour to that presented by the front wall 26 and the bottom plate 28 to the rear thereof, is hinged at its rear lower edge on a transverse axis by means of a shaft 42 mounted between side walls 22, the hinge axis being substantially in the plane of the bottom plate 28 although preferably slightly thereabove. It has a portion or section 44 directly in front of the hinge which is preferably very slightly convex downward, and projects slightly into and closes the aircraft fuselage skin opening 32, when the tongue is in its lowermost position of adjustment. The front end of the tongue section 44 contacts the lip 34 and a second portion 46 of the tongue extends, in elevational contour, from the lip 34 in a smooth curve which diverges from the lower curved portion 50 of the front wall 26, merging into a curve of longer radius of a third portion 48 which is parallel to the juxtaposed curved portion 52 of the front wall 26. An extreme upper end portion 54 of the tongue 40 has an outwardly curving flared contour which, taken with the corresponding flared upper ends of the stationary front and side walls, forms a bell shaped intake when the tongue is in the closed position shown diagrammatically in full lines in Figure 4.

This bell-shaped intake is the upper end of a passage 56 which has a constant cross section between front wall portion 48 and tongue portion 52, a downstream decreasing cross section between front wall portion 46 and tongue portion 50, and a discharge end at the lip 34 which is, however, entirely closed when the tongue is in the full line position of Figure 4. As the tongue swings upwardly and rearwardly about the shaft 42, an outlet opening 58 is formed between the lip 34 and the tongue. Immediately upstream therefrom, an upstream diverging passage portion 60 is maintained but at a smaller angle of divergence and of greater cross sectional area than before. Still further upstream a parallel sided passage portion 62 of the same areal opening as before is maintained at a constant value. This is true because the tongue portion 48 extends further downstream than the front wall portion 52 when the tongue is in the closed position and this downstream extension moves upward into position opposite front wall portion 52 as the tongue swings open.

Obviously the arcs of portions 48 and 52 are concentric on shaft 42 as a center having radii 49 and 53 respectively. Obviously also the arcs of portions 46 and 50 are not concentric. The radii 41 and 51 and centers 55 and 57 of these latter two arcs respectively are determined by the considerations of fairing portions 46 and 50 with adjoining wall and tongue portions, by the 10° angle desired between their common tangent 47 and the fuselage skin at lip 34, and by the tongue contour where the tongue contacts the lip 34. Centers 55 and 57 are located at the intersections respectively of radial lines 49 and 53 with a line 59 drawn through the tip of lip 34 at an angle of 90° to the tangent line 47. The position and orientation of the constant section 62 of the passage 56 is determined by the size of outlet passage necessary, by the space available for movement of the tongue, and by other design considerations.

As the tongue 40 swings upwardly still further about its pivot shaft 42 the parallel section 48 moves upwardly beyond registry with front wall section 52. This relative position begins as the tongue moves upwardly from the broken line position C on Figure 4 toward broken line position D. As the tongue moves between positions C and D the lower end of section 48 of the tongue moves rapidly away from the lip 36 widening the span and consequently the opening of the passage 56 permitting a large volumetric flow of air to pass into the ambient atmosphere from the cabin.

Between positions C and D, the passage 56 downstream from the air intake opening between lip 36 and the tongue 40 is at all points greater than the intake opening, so that the intake opening becomes the principal determinant of the rate of air flow. At positions below position C or more exactly below a position C$^a$ some what below position C, the throat indicated by the measurement line F does not determine the rate of air flow, because the passage 56 decreases downstream to the outlet opening 58, the size of this opening then becoming the principal determinant of the rate of air flow.

The performance characteristics of the valve may now be set forth. In the full line tongue position A of Figure 4, the outlet pasage is closed and no air flow beyond slight leakage can occur. This is the position taken by the valve in case of engine and/or compressor failure or other emergency conditions at high altitudes, in order to maintain a livable supercharge pressure as long as possible.

B position of the tongue is approximately a mean operative position for supercharging the cabin at the altitude most commonly traveled. Variations in cabin pressure from the desired livable schedule of cabin pressure control automatically bring about compensating movement and positional variation of the tongue, an increase in pressure over that desired bringing about an elevation of the tongue and a decrease in pressure over that desired bringing about a lowering of the tongue.

The air flow speed at the discharge opening 58 may at times become as high as the velocity of sound. Assuming the desired livable cabin pressure to be 10 pounds per square inch absolute value and the ambient atmospheric pressure to be 5 pounds or less, the velocity of the airstream through the opening 58 will closely approach or equal that of sound. The streamlining of the forward wall 26 and tongue 40 and the small acute angle of discharge of the airstream in an aft direction holds the generation of sound waves to a minimum. These sound waves, if the shape of the passage walls is not streamlined but such as to promote their creation, may be carried back into the cabin, augmented by resonant sound-emitting vibration of parts of the outlet device and neighboring structural elements of the aircraft. This streamlining of the passage walls is maintained during all positions between position A and position C.

Expansion of the airstream at stations along a passage of such a streamlined character, especially along the high speed downstream portion of the passage near the outlet throat 58 may cause a sufficient cooling of the airstream to lower the air temperature below freezing, bringing about deposition of ice on the walls of the passage orifice or surfaces downstream therefrom. In an outlet device of this invention possible deposition of ice is eliminated, since between positions A and C the cross sectional area of the passage decreases downstream to the very outlet orifice 58, and final release and expansion takes place in the slipstream without lateral enclosure. Under these conditions any loss of temperature in the discharging air jet is ineffective to produce icing, since the air jet is almost instantly swallowed up in the slipstream and swept rapidly away from the fuselage surface.

Since the discharging air jet is directed into the slipstream at a small acute angle to the flight direction of the aircraft, its power, which may be as much as 50 per cent of the delivered horsepower of the compressor, acts as a propulsive jet. Furthermore, turbulence and its resulting drag are small, as compared to that accompanying an air jet discharging into the airstream at a larger acute angle, in a normal direction, or in a forward direction.

The tongue 40 is rotated on the pivot shaft between closed position A and wide open position D by an electric motor 64. The driving mechanism between motor and tongue comprises a motor shaft 66, worm 68, worm gear 70, reduction gearing 120 consisting of gear 72 and gear segment 74 and further comprises a shaft 76 driven by gearing 120, link 78 fixed to shaft 76 and link 80, pivoted to the free end of link 78 at its upper end and to the back of tongue 40 at a point along the lowermost section 44 thereof. When the tongue is in closed position A, the links 78 and 80, which have a toggle relation, are near a longitudinally aligned position and hold the tongue firmly in closed position. As the motor rotates in a direction to move the tongue in an opening direction, the arcuate travel of the tongue is at first slow relative to the speed of the constant speed motor 64, the speed of this arcuate travel increasing and reaching its greatest value when the tongue is in the upper ventilating range of its travel between positions C and D.

This speed performance of the tongue provides the greatest control sensitivity at tongue positions of small opening in which very small increments of angular movement of the tongue have a relatively great effect on the cabin pressure, and provides a relative rapid movement of the tongue over the ventilating section of its travel where large increments of angular movement of the tongue are necessary to effect a relatively small change in the volumetric flow rate of the ventilating airstream.

One suitable form of control system for the operation of the motor 64 and consequently of the tongue 40 is shown schematically and diagrammatically in Figure 1. Electric current from a battery 82 or other source, may flow through conductors 84 and 86 to a movable terminal 88 of a double throw relay 90. When terminal 88 contacts the stationary terminal of conductor 92, current flows to movable contact 94 of a limit switch 96, which is also shown structurally in Figure 2. Switch 96 is operated by a cam 98 which is fixedly carried by and rotates with shaft 76. Similarly terminal 88, when contacting the stationary terminal of conductor 100, sends current to movable contact 102 of limit switch 104 operated by cam 105, similarly carried by shaft 76.

When limit switch 96 is closed, current may flow through conductor 106 to field coil 108 and thence through conductor 110 to motor 64 and ground 112 to operate the motor in a direction to move the tongue 40 upwardly. When limit switch 104 is closed, conductor 114 and field coil 116 are connected so that the direction of rotation of the motor 64 may be reversed. Electromagnetic clutch 118, connected at all times in series with the motor, connects shaft 66 to the motor 64 to drive the shaft 76, only when the motor is energized, thereby providing a quick stop to tongue movement in advance of cessation of motor rotation. The motor may continue to rotate by momentum after deenergization of the motor and in the absence of clutch 118, may cause the tongue to overrun its proper position of regulation.

Cam 98 disconnects contact 94 when the tongue reaches position C in its upward travel and further movement of the tongue in the opening direction over the ventilating section of its travel may not be accomplished by the motor 64. Cam 105, on the other hand, does not disconnect limit switch 104 until tongue 48 reaches the fully closed position A in its downward travel. Thus the movable contact 88 by a leftward movement at any other than closed position A will energize the motor for downward movement of the tongue, while rightward movement will energize the motor for upward travel only when the tongue is at a position below position C.

Adjustive operation of the tongue 40 may, however, be effected manually in either direction and when the tongue is at any position within either the ventilating range or the supercharging range of its travel. The manual operating means comprises a Bowden cable 122 and a manual lever 123 connected to the cable end and accessible to the pilot. A signal light 124 is connected in a shunt circuit from conductor 84 through switch 126. The switch is operated by a cam 127 which rotates with shaft 76, to illuminate the lamp only when the tongue is somewhere between positions C and D as an indication to the pilot that the cabin is unsupercharged.

The movable contact 88 on double-pole relay 90 occupies either a rightward, leftward, or neutral position depending upon when either one, or neither, of the electromagnets 128 and 130 is at this time energized from battery 82 by the selective switching action of the pressure responsive instrument 132. This instrument may be of such a nature as to be effective by itself, not requiring the cooperation of any other instrumentality and operating out in the open in the compartment, without being enclosed in an anticipator compartment, to actuate the aforedescribed control system; but for purposes of more complete illustration is shown as connected into an anticipator air circuit consisting of conduit 134, which connects the instrument with the blower discharge duct 18, and of a conduit 136 connecting the instrument with the constant area section 62 of the outlet passage 56. Since the anticipator air circuit and the detailed devices of the pressure responsive instrument 132 do not form a part of this invention, they are not structurally shown or described herein. Reference is made to my application, Serial No. 446,039, for a Control for pressure cabin, filed June 6, 1942, for a full description of these features of the cabin air pressure system with which the cabin pressure control valve of this invention is used and to which as respects the anticipator air circuit thereof, certain inventive features of the control valve are especially adapted. Preferably the discharge end of conduit 136 is a Venturi tube 138 (Figure 2) arranged longitudinally of the airstream within section 62, and into the side of which is teed the end of conduit 136.

In cases where the aforementioned anticipator air circuit is employed, the functioning of the anticipator air circuit is predicated upon its ability to rapidly integrate changes in amount of blower air flow into the cabin as compared to air discharged from the cabin and to impress this integration on the cabin pressure regulator. The static pressure at the discharge end of conduit 136 for the desired anticipator operation must vary only with changes in the amount of air discharged through the valve and must create a magnitude of suction at the discharge end of conduit 136 in proportion to the amount of air discharged. A common device for producing suction in such proportion is a Venturi tube. Outlet passage 56 and particularly section 62 of this passage is in fact the throat of a Venturi tube. The suction created at the throat of any venturi results from and is proportional to the velocity therethrough. If a constant area of throat is maintained in a venturi, then the suction measurement of velocity is also a measure of volume which in turn is a measure of amount of air flowing. Disposing the Venturi tube 138 (Figure 2) at the end of conduit 136 actually creates a double venturi or venturi within a venturi, the purpose of which is to intensify the suction created by the discharge air flow.

Since passage section 62 is of constant cross section for all positions of the tongue 40 between positions A and $C^a$, the difference in static pressure between the discharge end of conduit 136 and the aircraft cabin will always be proportional to the air flowing out into the ambient atmosphere. If the size of this passage was variable during operation of the valve between positions A and $C^a$ instead of constant as in this invention, then the difference in static pressure between the discharge end of conduit 136 and the aircraft cabin would vary with changes in valve position as well as with changes in air flow and the desired anticipator reaction would not be attained.

When the tongue passes upward beyond position $C^a$, it enters a transitional stage of its travel between C and $C^a$ during which it is still motor operated and during which it effects practically no change in the back pressure impressed upon the cabin, because in this transition stage, passage 62 is of nearly constant area and the discharge opening of the valve is larger at all stations therebelow. The minimum area of passage 62 for valve position C is chosen such that the back pressure to the cabin, above ambient air pressure, resulting from the passage of blower air therethrough, is sufficiently small that even at ambient air pressures above 10 pounds per square inch absolute, turning the blower on or off does not effect a change in cabin pressure sufficient to be physiologically sensible to the cabin occupants, i. e., turning the blower on or off changes cabin pressure in the range of .02 to .25 pound per square inch, the value to be chosen being dependent upon the rate that the blower can be made to stop or regain flow, upon blower capacity, and other related conditions.

In the operation of the cabin outlet device and the associated control system of this invention, at and for some time after takeoff, the instrument 132 normally holds the movable contact in its rightward position in response to the satisfactory pressure existing in the cabin. The valve tongue 40 may be at any position at or between C and D of Figure 4. The cams 98, 105, and 127 are in the positions as shown in Figure 1. Cam 98 holds contact 94 inoperative. The tongue 40 may only be operated manually by the pilot which he does in accordance with temperature conditions, with the number of passengers, and with the other factors which affect satisfactory aircraft cabin ventilation. The lamp 124 is illuminated at such times. Under these conditions, there is only a very small pressure difference between the cabin and the ambient atmosphere, due to the large opening between the tongue 40 and the lip 36.

When in climbing and due to the low ambient pressure, the cabin pressure drops below a predetermined value, say a fixed value of 10 pounds per square inch, or a value functionally related by the regulator to time or ambient atmospheric pressure, the pressure responsive instrument 132 pulls the contact 88 to the left and since the cam 105 is permitting the contact 102 to be in operative position, the motor lowers the tongue through position C$^a$ and to a position as much lower as may bring about a movement of contact 88 to the neutral position. The instrument 132 is adjusted to disconnect both magnets of relay 90 at cabin pressures within a small allowable pressure range above and below a desirable cabin pressure value determined by the cabin pressure regulator. When upon further climbing, upon descending, or from other causes, the pressure fluctuates from the desired schedule, the relay 90 is actuated to make contact and thereby elevated or lowered to create the required cabin pressure.

Should the tongue reach position A, cam 102 breaks the power circuit. When during descent to lower altitude, the tongue reaches position C, cam 98 breaks the power circuit and again the tongue may be manually operated until the pressure drop in the cabin moves contact 88 to the left upon climbing, upon resetting the regulator or from other causes.

Figure 3:
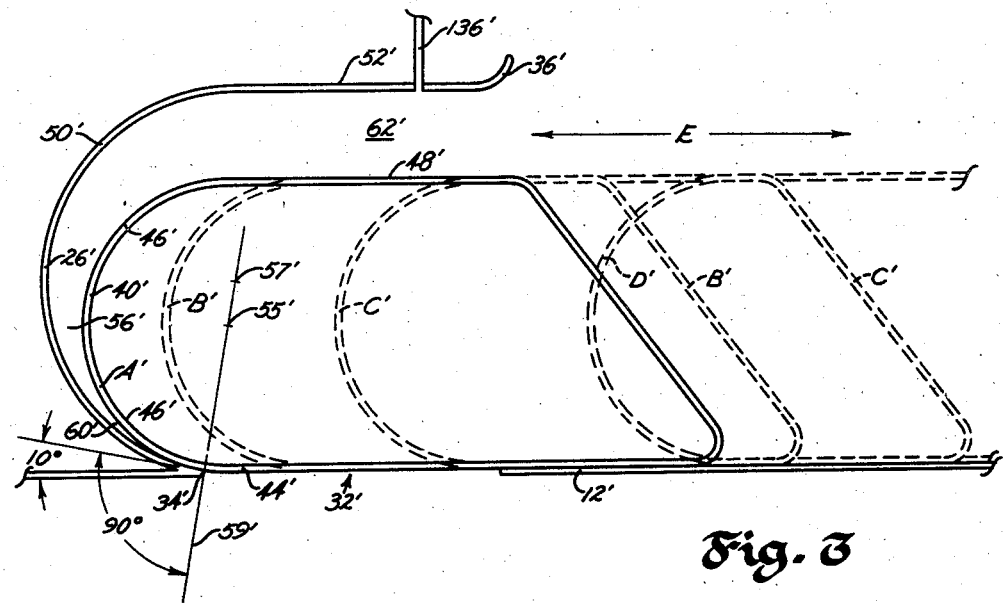
Figure 3 is a diagrammatic view of a modified form of the invention.

The invention may be embodied in valved outlets of other structural details than that shown in Figures 1, 2 and 4. Figure 3 illustrates one such embodiment. A longitudinally translatably slidable tongue 40' is movably related to a stationary passage wall 26', as indicated by arrows E. Elements and parts of this form of the invention and the valve positions thereof are numbered or lettered in correspondence with the other form of the invention with the addition of a prime suffix. The action and operation of this modified structure are apparent without extended description and explanation. The movement of translation is controlled by power means and manually as before.

Without changing functional realtionships, the passage 62' may be made to extend and open to the left by curving the upper portion of the section 50' of the stationary wall 26' to the left terminating in a horizontal tangent and correspondingly curving the upper portion of the section 46' of the wall 40' to the left, terminating in a horizontal tangent spaced vertically above the stationary horizontal tangent surface a distance equal to the width of the passage 62'. The passage 62' would then present in cross sectional contour a profile generally in the shape of an ogee instead of a letter C as in Figure 3.

It is also apparent that the walls of the passage 56 or 56' in either form of the invention selected to illustrate it herein may be variously related without departing from the principles of the invention. Thus one or both of the side walls 22, or at least enough of these side walls to bridge the lateral opening between wall 26 and tongue 40, may be secured to and movable with the tongue 40 instead of being secured to the stationary wall 26.

The invention is not limited in its application to an outlet for compartments occupied by flight personnel on aircraft. As an example, a device embodying the invention may be used to provide a discharge outlet for any compressed gas being discharged from the aircraft, however generated, in order to realize one or more of the objects of the invention described above.

The invention inheres in certain characteristics of certain structural elements and in certain relationships between these elements and is to be given the definitional scope of the following claims.

I claim:

1. In an outlet valve device for a superchargeable aircraft compartment provided with a pressure generating air induction means, the combination of: wall means defining at least one side of a discharge passage communicating with the interior of the compartment at its inlet and at its outlet discharging directly into a laterally unconfined space outside the compartment wall, said wall means extending to the compartment wall; a valvar wall extending to the compartment wall and movable with respect to said wall means over an adjustment range and so related to said wall means as to complete the defining of the sides of the passage to the compartment wall and in the course of its movement of adjustment to vary, between maximum values and minimum values, the cross sectional areas of the passage, at points along at least a portion adjacent the outlet, said valvar wall being mounted with respect to said wall means to provide an outlet opening at the compartment wall small enough to produce high air flow velocities therethrough when in positions of adjustment along at least a substantial portion of said range of adjustment and to establish when in any of said positions, a cross sectional area along at least a substantial portion of the passage which continuously decreases to the outlet end thereof, whereby cooling of the air from expansion is prevented at any point along said passage; and operating means for said valvar wall.

2. In the combination defined in claim 1, an air stream wall of the aircraft having an opening axially normal to said air stream wall, the wall means that define at least one side of the discharge passage of the outlet valve device being adapted for disposition in the opening and being directed rearward of the aircraft at an acute angle of not more than 25 degrees with respect to the direction of said air stream; and the outlet-end portion of said valvar wall, when the valvar wall is adjusted to one of the aforesaid high velocity producing positions, overlying said opening, and extending at an angle to the air stream substantially equivalent to that of the passage outlet.

3. In an outlet valve device for an aircraft compartment provided with an air inducting compressor, the combination of: wall means defining at least one side of a discharge passage communicating with the interior of the compartment at its inlet and at its outlet discharging directly through an exterior wall of the aircraft into the ambient airstream, said wall means extending to said exterior wall; a valvar wall extending to the said exterior wall and movable with respect to said wall means over an adjustment range and so related to said wall means as to complete the defining of the sides of the passage to the said exterior wall and in the course of its movement of adjustment to vary, between maximum values and minimum values, the cross sectional areas of the passage, at points along at least a portion adjacent the outlet, said valvar wall being mounted with respect to said wall means to provide a downstream decreasing cross sectional area in the passage and resultant high air flow velocities at the outlet of said passage when in any position of adjustment along at least a substantial portion of said range of adjustment, said wall means and valvar wall at any said position of adjustment of the valvar wall being disposed to direct the axis of the passage rearward of the airplane into said ambient airstream at an acute angle thereto, and operating means for said valvar wall.

4. The combination defined in claim 3 in which said angle varies in correspondence with the movement of adjustment of the valvar wall over said portion of said range of adjustment up to values not exceeding 25 degrees.

5. In an outlet valve device for a superchargeable aircraft cabin provided with an air inducting compressor, the combination of: stationary wall means presenting in cross section a portion only of the sides of a discharge passage connecting the compartment interior with an aperture in the aircraft wall, said aperture opening directly into the ambient airstream, said wall means extending to said aperture; a valvar wall extending to said aperture and movable with respect to said wall means and presenting in cross section the remaining portion of the sides of said passage, said wall means and valvar wall being longitudinally relatively contoured and said valvar wall being mounted so that the cross sectional area of at least the outlet end portion of the passage decreases toward the outlet and movement of the valvar wall varies the cross sectional area of at least the outlet end portion and correspondingly of the outlet of said passage, said outlet end being directed rearwardly and outwardly of the aircraft at an acute angle to the ambient airstream; and means for controllably moving said valvar wall to different positions to vary in said manner the cross sectional area of the passage and the outlet end thereof.

6. The combination defined in claim 5 in which the valvar wall is transverse the aircraft and is movable longitudinally thereof.

7. The combination defined in claim 5 in which the valvar wall is transverse the aircraft and movable longitudinally thereof and forms the rear side of the passage.

8. The combination defined in claim 5 in which the aircraft aperture opens axially transversely to and directly into the airstream, in which the valvar wall is transverse the aircraft and is movable longitudinally thereof and is shaped and mounted to overlie the aircraft aperture in varying degrees over its range of movement with respect to the stationary passage walls.

9. The combination defined in claim 5 in which the aircraft aperture opens axially transversely to and directly into the airstream and in which the valvar wall constitutes the rear side of the passage, is hinged on a transverse axis at its outlet end in the plane of and at the rear of said aperture, and is formed with a wall portion in front of the hinge axis which closes the aircraft aperture in the extreme forward and outward pivotal position of the valvar wall and is further formed with a curved streamlined forward extension of said wall portion which defines with the forward stationary wall means a passage immediately forward of the aircraft aperture of forwardly and inwardly increasing width, two lateral faces of said valvar wall contactually sliding between two opposite faces on the stationary side wall means of said passage.

10. In an outlet device for a superchargeable aircraft compartment, provided with an air inducting compressor and a pressure responsive regulatory means for the outlet device comprising means defining and establishing an anticipator regulatory air circuit having an outlet, the combination of: stationary wall means and a movable valvar wall forming a passage from the compartment to the ambient atmosphere, the movable wall being shaped and mounted with respect to the stationary wall means to have a wall portion parallel to the opposite stationary wall of the passage and a wall portion which is a continuous down-stream extension of said parallel wall portion and converges downstream toward the opposite stationary wall to the outlet opening; means for moving the valvar wall as a whole to move the parallel portion thereof in parallelism to the opposite stationary wall and the converging portion thereof toward or from the opposite stationary wall, the portion of the passage having said parallel walls being adapted for connection to the outlet of said air circuit.

11. In an outlet device for a superchargeable aircraft compartment, provided with an air inducting compressor and a pressure responsive regulatory means for the outlet device comprising means defining and establishing an anticipator regulatory air circuit having an outlet, the combination of: stationary wall means and a movable valvar wall forming a passage from the compartment to the ambient atmosphere, the movable wall being shaped and mounted with respect to the stationary wall means to have a wall portion parallel to the opposite stationary wall of the passage and a wall portion which is a continuous downstream extension of said parallel portion and which converges downstream toward the opposite stationary wall to the outle opening; means for moving the valvar wall as a whole to move the parallel portion thereof in parallelism to the opposite stationary wall and the converging portion thereof toward or from the opposite stationary wall; and a Venturi tube in the parallel walled portion of the passage adapted to be connected to said air circuit at the outlet end thereof.

12. In an outlet valve device for a superchargeable aircraft compartment provided with an air inducting compressor, the combination of: stationary wall means presenting in cross section a portion only of the sides of a discharge passage connecting the compartment interior with an aperture in the aircraft wall, said aperture opening directly into the ambient airstream; a valvar wall movable over a definite travel path with respect to said walls and presenting in cross section the remaining portion of the sides of said passage, said wall means and valvar wall being longitudinally relatively contoured and said valvar wall being mounted relative to said wall means so that movement of the valvar wall varies the cross sectional area of the outlet end of said passage, and so that in one end portion of its travel the minimum cross sectional area of the passage between it and the inner end of the stationary wall means has a varying value which does not exceed a value so related to the volume of the compartment and the compressor performance that the change in the compartment pressure at absolute ambient atmospheric pressures in excess of 10 pounds per square inch upon turning the compressor on or off is between .02 and .25 pounds per square inch and in the other end portion of its travel said cross sectional area between it and the inner end of the stationary walls progressively increases above said related value; and means for moving the valvar wall.

13. In an outlet valve device for a supercharge-able aircraft compartment provided with an air compressor, the combination of: stationary wall means constituting peripherally a portion only of the sides of a discharge passage; a movable valvar wall slidable on said stationary wall means and constituting peripherally the remaining portion of the sides of said passage; means for sliding said valvar wall over a limited travel, the longitudinal contours of said wall means and said valvar wall and the mounting of the valvar wall relative to the wall means being such that the cross sectional area of the passage varies at stations along the passage, and over one end portion of its travel in one direction, a throat between valvar and stationary wall means of gradually increasing minimum cross section is presented, the maximum value of said minimum cross section being just sufficiently small to create a physiologically sensible pressure change in the compartment for ambient atmospheric pressures in excess of 10 pounds per square inch in response to starting or stopping a compressor of given capacity operating at a given speed, and that over the remainder of its travel in said direction said minimum cross section further increases to provide outlet for the compartment air at relatively large volumetric rates without the establishment of physiologically sensible back pressure.

14. The combination defined in claim 13, in which there is an anticipator regulatory air circuit having an inlet and an outlet and operatively interposed between the compressor and the outlet valve for the compartment, and in which the valvar wall is so constructed and mounted that during the said end portion of its travel a portion of said passage is of a constant cross section at said maximum value whereby it is suitable for the outlet of the anticipator regulatory air circuit.

15. The combination defined in claim 13 in which the stationary and valvar walls are so constructed and mounted that at the initial end of the travel of the valvar wall over said end portion in said direction the valvar and stationary walls are in closed contact at the outlet end of the passage.

16. The combination defined in claim 13 and in addition thereto; power means; control means responsive to increasing compartment air pressure for connecting the power means at any position of said valvar wall along said end portion of its travel to move the valvar wall in said direction; automatic means connected to operate responsively to the movement of said valvar wall for disconnecting said power means at the end of said end portion travel in said direction; control means responsive to decreasing compartment air pressure for connecting the power means at any position of said valvar wall along its entire travel to move the valvar wall in the opposite direction; automatic means connected to operate responsively to the movement of said valvar wall for disconnecting said power means at the end of its travel in said opposite direction; and manual means for moving said valvar wall over at least the said remainder of its travel in either direction.

17. The combination defined in claim 13 and in addition thereto; power means; control means responsive to increasing compartment air pressure for connecting the power means to move the valvar wall from any position of the said end portion of its travel in said direction; automatic means connected to operate responsively to the movement of the valvar wall for disconnecting said power means at the end of said end portion travel in said direction; control means responsive to decreasing compartment air pressure for connecting the power means to move the valvar wall from any position of its entire travel in the opposite direction; automatic means connected to operate responsively to the movement of the valvar wall for disconnecting said power means at the end of its travel in said opposite direction; manual means for moving said valvar wall over at least the said remainder of its travel in either direction; and means indicating the disposition of the valvar wall along said remainder of its travel.

18. The combination defined in claim 13 and in addition thereto a shaft; means for rotating said shaft; and motion transmitting means between said shaft and valvar wall for moving said valvar wall in said direction over said end portion of the travel of said valvar wall to increase said minimum throat at an increasing rate relative to the speed of the shaft and over said remainder of the travel in said direction to increase said minimum throat at a rate relative to the shaft speed which is substantially greater than the rates of increase of the minimum throat over said end portion of the travel of said valvar wall.

19. In an outlet device for a superchargeable aircraft compartment, the combination of: stationary wall means presenting in cross section a portion only of the sides of a discharge passage connecting the compartment interior with an aperture in the aircraft wall, said wall means extending to said aperture and said aperture opening directly into the ambient airstream; a valvar wall extending to said aperture and movable with respect to said wall means and presenting in cross section the remaining portion of the sides of said passage and having two lateral faces contactually slidably engaging two opposite faces on the stationary wall means as it moves relative to said stationary wall means; and means for moving said valvar wall to different positions to vary the minimum cross sectional area of said passage and simultaneously to give the passage at any one of said different positions a cross sectional area which increases upstream for an extended distance from said aperture.

20. In a superchargeable aircraft, the combination of: a compartment constructed for supercharging; means for supplying air to said compartment at pressures above that of the ambient atmosphere; an air discharge duct defining a longitudinally streamlined passage of gradually decreasing cross section downstream to a terminal station of minimum cross section; means for moving the side walls of the duct relatively to each other to vary said minimum cross section from a maximum value to zero while maintaining the characteristic of said gradually decreasing cross section, the passage at the station of said minimum cross section being so directed and positioned relative to the airstream exterior of the aircraft that the air is discharged from said passage directly, without lateral confinement beyond said station, into and in the general direction of said airstream.

21. An outlet valve device, including the combination of: stationary wall means and a movable valvar wall forming a passage, the movable wall being shaped and mounted with respect to the stationary wall means to have a wall portion parallel to the opposite stationary wall of the passage and a wall portion which is a continuous downstream extension of said parallel wall portion and converges downstream toward the opposite stationary wall to the outlet opening of the valve; and means for moving the valvar wall as a whole to move the parallel portion thereof in parallelism to the opposite stationary wall and the converging portion thereof toward or from the opposite stationary wall.

22. The combination defined in claim 13, in which the valvar wall is so constructed and mounted that, during the said end portion of its travel, a portion of said passage is of a constant cross-section at said maximum value.

BRUCE E. DEL MAR.